Dec. 19, 1939.    J. W. ALLEN    2,184,032
DRIVING MECHANISM
Filed Nov. 16, 1935    2 Sheets-Sheet 1

INVENTOR.
Joseph W. Allen
BY
Martin J. Finnegan
ATTORNEY.

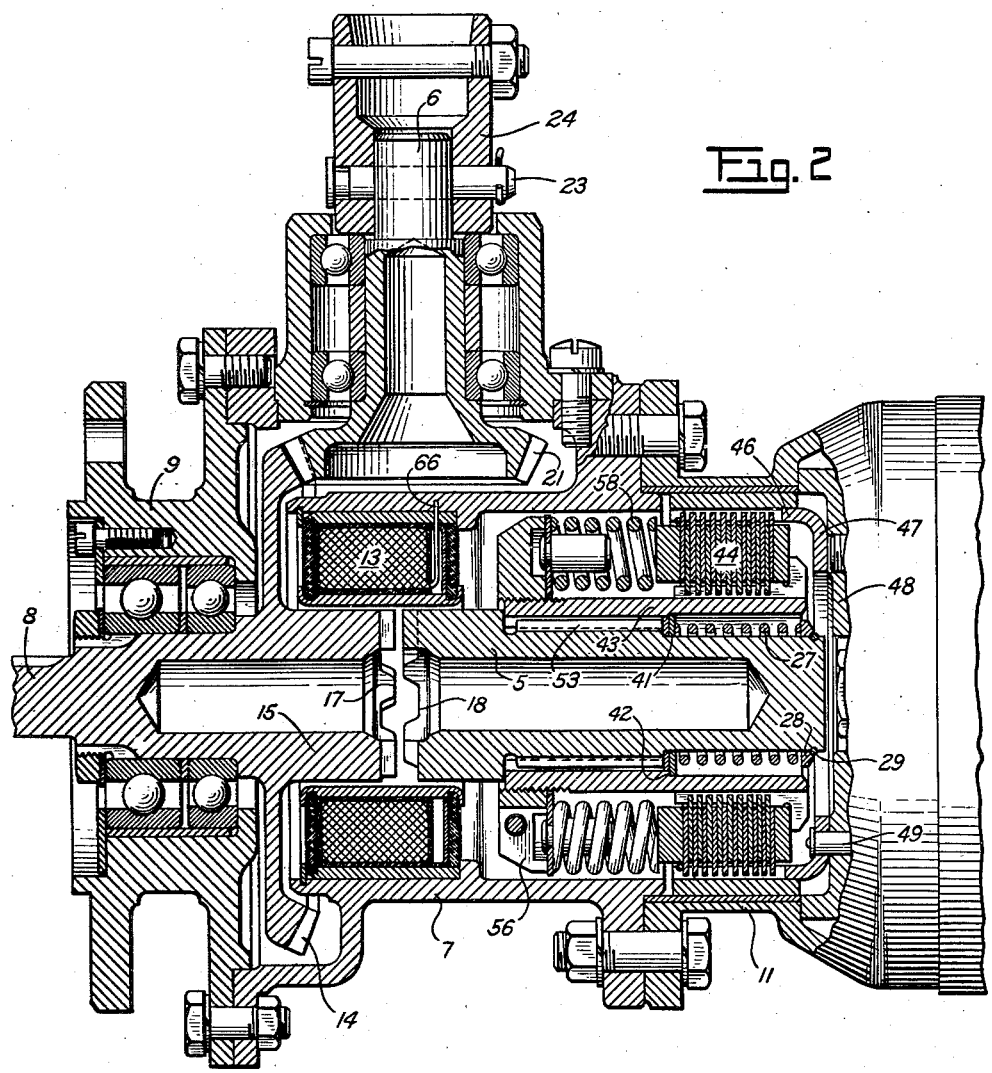

Patented Dec. 19, 1939

2,184,032

UNITED STATES PATENT OFFICE 2,184,032

DRIVING MECHANISM

Joseph W. Allen, East Orange, N. J., assignor to Eclipse Aviation Corporation, East Orange, N. J., a corporation of New Jersey Application November 16, 1935, Serial No. 50,229

4 Claims. (Cl. 74—389)

This invention relates to clutch mechanism, and particularly to clutch mechanism of a selective engagement character, wherein the transmission of torque may occur through one or the other of a plurality of sets of clutch elements, depending upon which is in the engaged position.

An object of the invention is to provide a novel construction and method of operation of such a clutch mechanism.

A second major object is to combine with such a clutch mechanism an additional yieldable clutch means enabling the motor to overrun the driven element as soon as the latter reaches the limit of its travel. This is of special importance in the actuation of aircraft landing gear, the improvement of which constitutes a third major object of the invention.

In the drawings:

Fig. 2 is a view similar to Fig. 1, but showing a simpler form of the invention.

Figure 1:
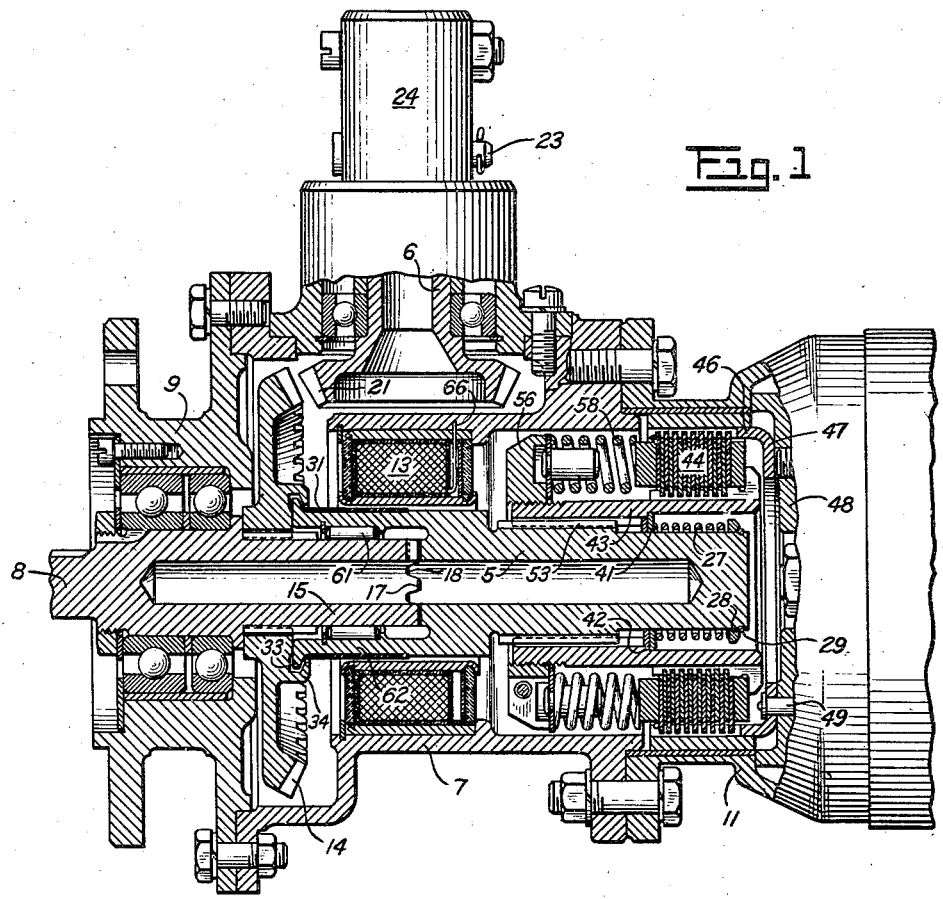
Fig. 1 is a longitudinal sectional view of a device embodying the invention.

Referring first to Figs. 1 and 2, reference characters 5 and 6 designate driving shafts mounted at right angles to one another in a common housing 7, either of the shafts being capable under certain conditions, of actuating a driven shaft 8 also journalled in an extension 9 of the housing 7, a similar extension 11 being provided as a means of housing a motor or other actuating means for the shaft 5.

Figure 3:
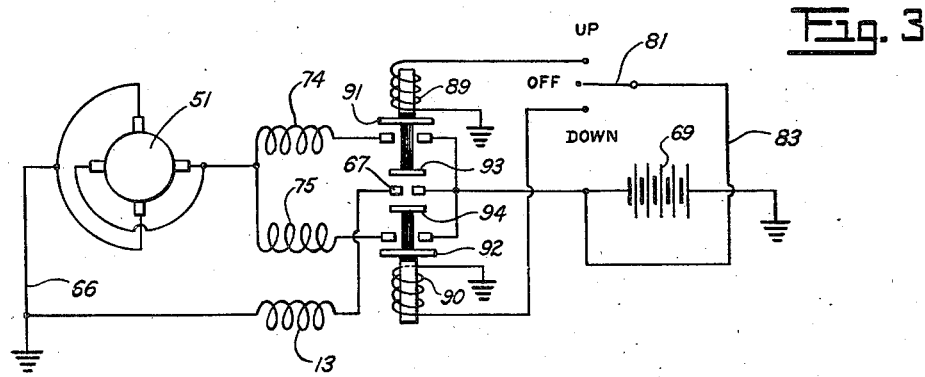
Fig. 3 is a schematic diagram of the electrical connections.

The elements involved in the choice of driving means for the driven shaft 8 (which may be the actuator of a landing gear such as that of the Minshall Patent No. 2,005,980, of June 25, 1935, or some other load to be driven) include a solenoid 13 and a bevel gear 14 herein shown as integral with the enlarged and centrally bored end 15 of the driven shaft 8 and so located with respect to the driving shafts 5 and 6 that it is capable of receiving rotation from either of said shafts depending upon whether it is in a left-hand position as shown in Fig. 1, or its right-hand position (not shown). In the former position the clutch teeth 17 which are formed upon the hollow end of the shaft 15 are fully engaged with the correspondingly shaped teeth 18 on the correspondingly bored end of the shaft 5, while in the latter position the teeth 17 and 18 are disengaged (as in Fig. 2), but the teeth of bevel gear 14 are fully meshed with those of the correspondingly shaped bevel pinion 21 shown herein as an integral extension of the driving shaft 6, the outer end of which is provided with a pin 23 or other suitable means serving for attachment of a sleeve 24 or other manually operable instrumentality. A coil compression spring 27 constantly bears against a collar 28 held fast to the inner end of shaft 5 by suitable means 29 and thus constantly exerts a pressure on the shaft 5 tending to demesh the teeth 18 from the teeth 17 of the shaft 8. Spring 27 therefore opposes the pull of the solenoid 13 and the latter when energized acts upon the shaft 5 which constitutes a movable magnetizable core with respect to the winding 13, a sleeve 31 of non-magnetizable material being wrapped about that portion of the core 5 which is on the left of the center line of the coil 13 so that the effect of the magnetic flux resulting from energization of the coil 13 is to draw the shaft 5 to the left, that is, from the position indicated in Fig. 2 to the position indicated in Fig. 1, the gear 14 moving with the said shaft 5 by reason of the interlocking projections 33 and 34 formed upon the shaft 5 and the gear 14 respectively. Upon de-energization of the solenoid 13 these interlocking projections are similarly effective to draw the gear 14 into mesh with the gear 21 in response to the thrust exerted by the expansion of the spring 27 from its fully compressed position, as shown in Fig. 1, to its extended position as shown in Fig. 2. The left-hand end of the spring 27 rests against collar or disc 41 which engages the shoulder 42 of the relatively stationary sleeve 43 constituting the inner race of a friction disc clutch 44 consisting of a plurality of interleaving friction plates splined alternately to the sleeve 43 and a second sleeve or shell 46 having an inwardly turned rim 47 secured to a driving member 48 by a suitable means such as that indicated at 49, the said driving means 48 being a part integral with or connecting to the armature of the electric motor indicated diagrammatically at 51 in Fig. 3. Transmission of torque from the clutch elements 46, 44 and 43 to the shaft 5 is provided for in the form of splines 53 on the shaft 5 engaging corresponding splines on the inner surface of the sleeve 43, the outer surface thereof being threaded to receive a nut 56 which constitutes a means for adjusting the pressure of springs 58 and hence the torque transmitting capacity of the clutch 44. If desired, roller bearings 61 may be interposed between the tubular extension 62 and the shaft 5 and the tubular extension 15 of the shaft 8 to facilitate relative rotation therebetween during the period of drive from the gear 21, at which time the clutch teeth 17 and 18 are disengaged. One end of the solenoid winding 13 is shown grounded to the frame of the motor at 66 in Figs. 1 and 2, and this ground connection is correspondingly designated in the diagram constituting Fig. 3, the opposite end of the winding being indicated in Fig. 3 as connecting to one terminal post 67 of a switch in circuit with a battery 69 constituting the source of current for the electric motor 51. The latter is preferably provided with four brushes as indicated in Fig. 3 and separate windings 74 and 75 one of which is energized to produce clockwise rotation of the motor in one position of switch 81, and the other of which is energized to produce counterclockwise rotation of the motor in the opposite position of the switch, said switch being connected with the source 69 as indicated at 83. Preferably switch 81 is in a pilot circuit to relays 89 and 90 which in turn control switches 91 and 92 respectively, through which the main current for the motor is caused to flow, the flow of current to the solenoid 13 being brought about by either one or the other of the bridging elements 93 and 94, depending upon which of the solenoids 89 or 90 is energized. In other words, the energization of the motor 51 in either a clockwise or counterclockwise direction results in a concurrent energization of the solenoid 13 and hence in a closure of the clutch 17, 18. In the event however, that it is desired to dispense with electrical operation, driven member 8 may be actuated manually or by other non-electrical means, acting through the shaft 6 and gear 21 to turn the gear 14 and hence the driven shaft 8. During such non-electrical operation the spring 27 holds the shafts 5 and 8 disconnected as above indicated, the gear 14 turning freely about the projection 33 under such circumstances.

In Fig. 2 I have shown a simpler form of the invention wherein the bevel gears 14 and 21 are adapted to remain in mesh at all times, the solenoid 13 being effective only upon the clutch element 18 to move said clutch element into engagement with the driven member 15, the two elements being normally disengaged by the action of spring 27 operating in the manner previously described with reference to Fig. 1. With this simplified arrangement it is possible to operate the driven member 8 from the manually operable shaft 6 without effecting any movement of the motor driven shaft 5 or parts associated therewith, just as in the embodiment previously described; during motor actuation however, the shaft 6 and parts associated therewith will be turned by the driven shaft 8 due to the permanent mesh between the gears 14 and 21. This idle turning of the shaft 6 is not necessarily objectionable in all installations, but where it is not desired the embodiment of Fig. 1 is of course, to be preferred.

In either embodiment, the pre-set clutch 44 enables the motor to overrun the shaft 8 as soon as the landing gear, or other "limited stroke" load, reaches the end of its travel, and even though the clutch 17, 18 remains engaged (due to tardiness in de-energizing coil 13, or for any other reason).

It is to be understood that these drawings are for the purposes of illustration only and are not to be construed as a limitation of the scope of the invention, reference being had for this purpose to the appended claims.

What I claim is:

1. In a driving mechanism, a pair of driving elements, a driven element common to both said driving elements, electro-magnetic means adjacent one of said driving elements to cause said one of said driving elements to engage said driven element, resilient means for shifting the driving connection to the other of said driving elements, and means for concurrently producing rotation of one of said driving elements and energization of said electro-magnetic means.

2. In a driving mechanism, a pair of driving elements, a driven element common to both said driving elements, electro-magnetic means adjacent one of said driving elements to cause said one of said driving elements to engage said driven element, resilient means for causing the first-named driving element to be withdrawn from engagement with said driven element, and means for concurrently producing rotation of one of said driving elements and energization of said electro-magnetic means.

3. In a driving mechanism, a pair of driving elements, a driven element common to both said driving elements, electro-magnetic means interposed between said driving elements to cause one of said driving elements to engage said driven element, resilient means for shifting the driving connection to the other of said driving elements, and means for concurrently producing rotation of one of said driving elements and energization of said electro-magnetic means.

4. In a driving mechanism, a pair of driving elements, a driven element common to both said driving elements, electro-magnetic means interposed between said driving elements to cause one of said driving elements to engage said driven element, resilient means for shifting the driving connection to the other of said driving elements and by the same action causing the first-named driving element to be withdrawn from engagement with said driven element, and means for concurrently producing rotation of one of said driving elements and energization of said electro-magnetic means.

JOSEPH W. ALLEN.